United States Patent [19]

Iijima

[11] Patent Number: 5,105,137

[45] Date of Patent: Apr. 14, 1992

[54] NUMERICAL CONTROL DEVICE FOR A GRINDING MACHINE

[75] Inventor: Ryuji Iijima, Narashino, Japan

[73] Assignee: Seiko Seiki Kabushiki Kaisha, Japan

[21] Appl. No.: 569,863

[22] Filed: Aug. 20, 1990

[30] Foreign Application Priority Data

Aug. 30, 1989 [JP] Japan .................. 1-224146

[51] Int. Cl.⁵ .................. B24B 49/10; G05B 19/18
[52] U.S. Cl. .................. 318/568.220; 318/600; 318/628; 318/632
[58] Field of Search ........... 318/560, 561, 567, 568.22, 318/569, 570, 571, 600, 628, 632

[56] References Cited

U.S. PATENT DOCUMENTS

| | | | |
|---|---|---|---|
| 3,967,176 | 6/1976 | Wagener et al. | 318/603 |
| 4,502,125 | 2/1985 | Yoneda et al. | 318/569 X |
| 4,577,271 | 3/1986 | Jones et al. | 364/174 |
| 4,733,343 | 3/1988 | Yoneda et al. | 318/565 X |
| 4,810,945 | 3/1989 | Yoneda et al. | 318/571 |
| 4,815,000 | 3/1989 | Yoneda et al. | 318/571 X |
| 4,902,951 | 2/1990 | Ohta et al. | 318/632 |
| 4,956,946 | 9/1990 | Tsujiuchi et al. | 51/165.71 |
| 4,967,515 | 11/1990 | Tsujiuchi et al. | 51/165.75 |

FOREIGN PATENT DOCUMENTS

0260326  3/1988  European Pat. Off. .
8402590  7/1984  PCT Int'l Appl. .

Primary Examiner—Bentsu Ro
Attorney, Agent, or Firm—Bruce L. Adams; Van C. Wilks

[57] ABSTRACT

A numerical control device for a grinding machine is equipped with a servo-motor which moves at least one of a spindle and a dresser. The spindle and/or the dresser moves relative to the dresser shaft center direction and the rotor shaft center direction. The numerical control device compensates an amount of servo lag using a target position compensation calculating circuit. A unit time target position is obtained by performing a track calculation at unit times on the basis of the amount of servo lag stored in a storage device. Feedback control of the servo motor is effected by calculating a compensated target position dependent on the unit time target position.

5 Claims, 10 Drawing Sheets

(CARRIED OUT BY CPU 23 EVERY TIME THE COMPENSATED TARGET POSITION IS TRANSFERRED FROM CPU 15 TO CPU 13)

(CARRIED OUT EVERY TIME THERE IS A REQUEST TO READ THE AMOUNT OF SERVO LAG FROM CPU 15)

FIG. 9

----- CALCULATED VALUE OF TARGET POSITION TRACK
—— ACTUAL TRACK OF GRINDSTONE TABEL

---- POSITION COMMAND TO THE SERVO MOTOR
—— ACTUAL MOVEMENT OF THE GRINDSTONE TABEL

FIG. 13 PRIOR ART

NUMERICAL CONTROL DEVICE FOR A GRINDING MACHINE

BACKGROUND OF THE INVENTION

1. Field of Industrial Application

The present invention relates to a numerical control device for a grinding machine to control, for example, the manufacturing of articles having a crowning shape.

2. Prior Art

Figure 10:
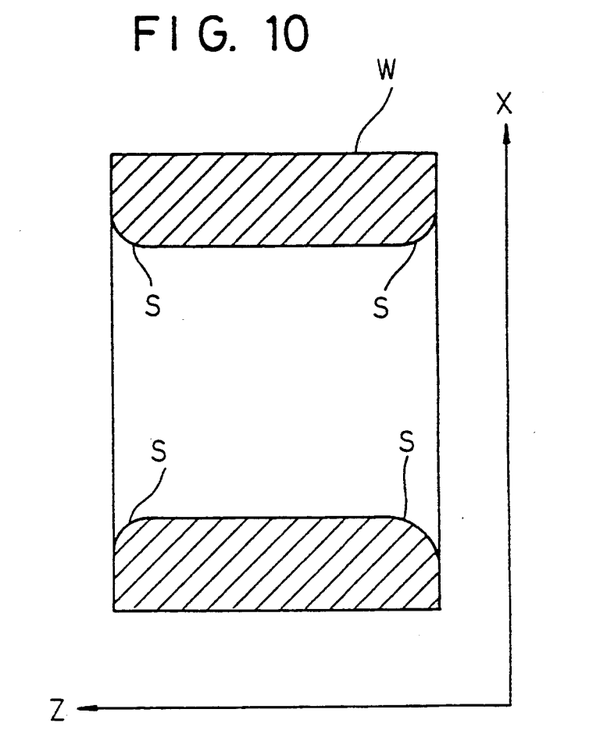
FIG. 10 is a section drawing of a workpiece which has a crowning shape.

A conventional grinding machine for grinding a workpiece W having a crowning shape S, is illustrated in FIG. 10. The grindstone table is moved, as shown by the dotted line in FIG. 11, in accordance with predetermined instructions in order to carry out a correction process, of its grindstone 29 by a dresser 32.

Figure 11:
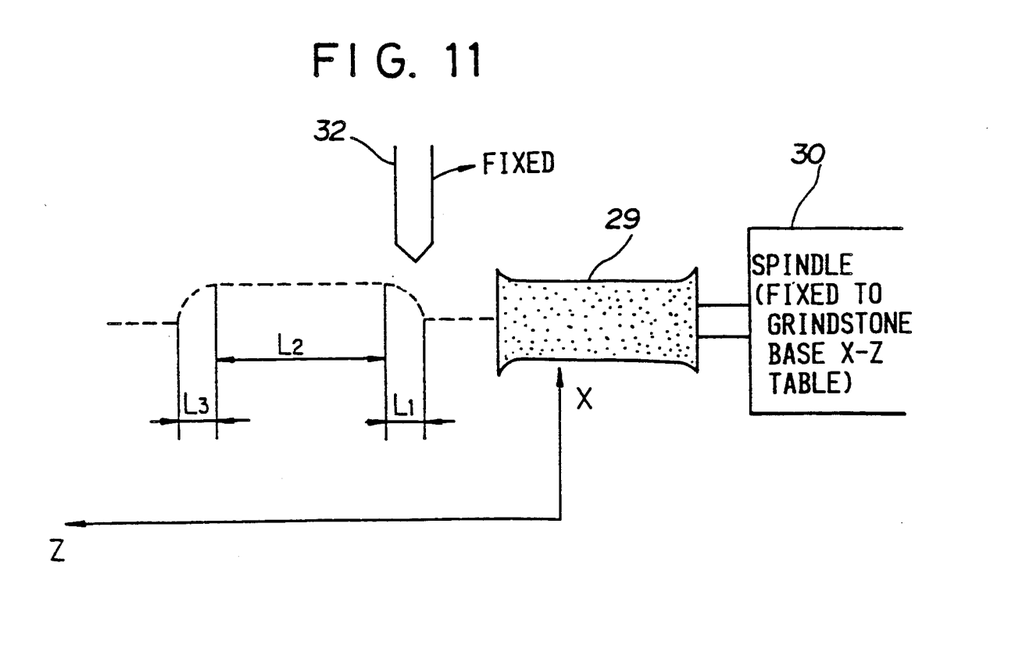
FIG. 11 is an explanatory drawing showing the grindstone correction track for correcting the workpiece shown in FIG. 10.

The grindstone 29 is fitted so as to be able to rotate on the end of a spindle 30, which is fixed on the grindstone table. The grindstone table is caused to move in the X and Z directions. The circular arc alterations L1 and L3 and the straight line alterations L2 are carried out through a dresser 32 and by means of this the grindstone correction process is carried out.

Figure 12:
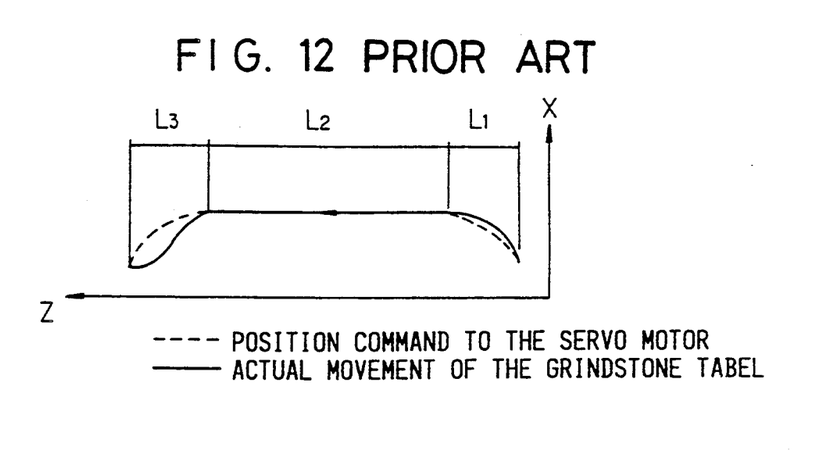
FIG. 12 is a diagram showing the position command to the servo-motor when grindstone correction is carried out by a conventional feedback control and the actual movements of the grindstone table.

Furthermore, the movement of the grindstone table is carried out by a conventional feedback control. In accordance with this conventional feedback control, the faster the grindstone table is moved the more lag occurs in the servo system and the adjustment shape therefore becomes disordered, as shown in FIG. 12. This results in problems such as inaccuracies in the grindstone correction process etc.

In other words, a so-called mis-instruction occurs which, as shown in FIG. 12, with regard to the actual movement of the grindstone table (shown by solid lines), is contrary to the correct position command for the servo-motor (shown by the dotted lines). The circular arc alteration L1 of the grindstone table is out of sync with the position command and, although it follows for the straight line alteration L2, it is again out of sync with the position command for the next circular arc alteration L3.

A feed forward control device has been proposed which decreases the lag in the servo system to decrease the disorder in alteration shape.

Figure 13:
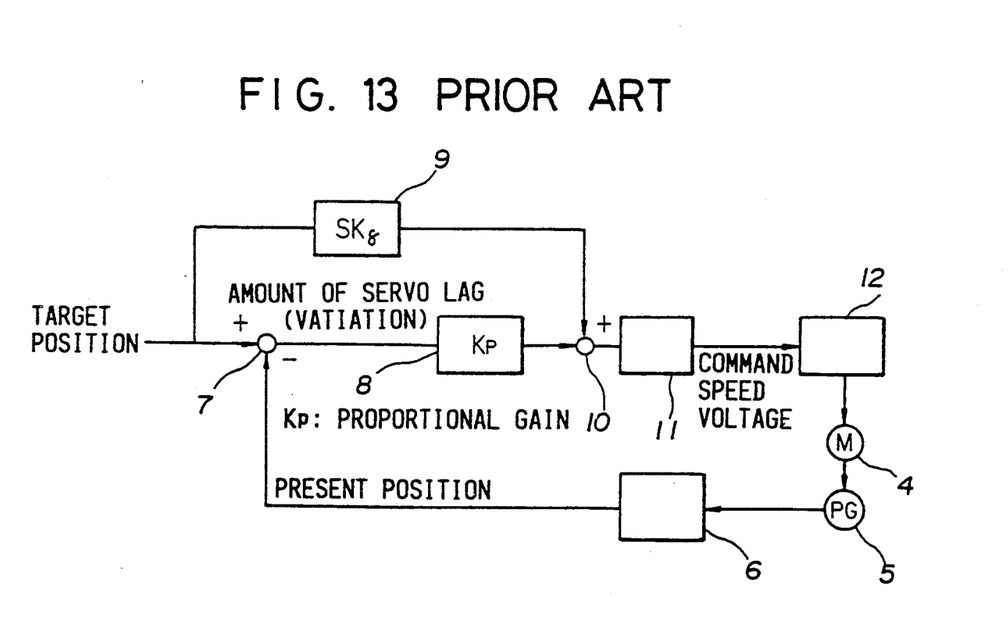
FIG. 13 is a block diagram showing a conventional feedback control.

FIG. 13 is a block diagram of the feed forward control device which is configured as described below.

The feed forward control device is made up of a pulse generator 5 linked to a servo-motor 4. A position converter 6 converts the output from the pulse generator 5 to a present position. A comparator 7 compares the present position output from the position converter 6 and a commanded target position output. A proportional calculator 8 determines from the output of the comparator 7 the amount of servo lag as a proportion of the command speed of the servo-motor 4. A feed forward calculator 9 adjusts the amount of servo-lag on the basis of the commanded target position output. An adding means 10 adds the output of the proportional calculator 8 and the output of the feed forward calculator 9. An analog voltage converter 11 converts the output of the adding means 10 into the servo-motor 4 command speed voltage. A servo driver 12 drives the servo-motor 4 on the basis of the output of the analog voltage converter 11.

Thus, when the target position is determined through a configuration like that given above, the present position of the servo-motor 4 is output to the comparator 7 through the pulse generator 5 and the position converter 6 and the target position and present position are compared in the comparator 7. The results of this comparison are output as an amount of servo lag to the proportional calculator 8 which determines a proportion of the servo-motor 4 command speed which is output to the adding means 10. Further, the target position command is output to the adding means 10 through the feed forward calculator 9 and both of the outputs are added. This addition of the output of feed forward calculator 9 is used to adjust the amount of servo lag. In this adjustment, the amount of servo lag is adjusted through a tuning operation performed by a human operator in order to make the actual grindstone table movement coincide with the position command given to the servo motor.

However, in devices which have such a conventional feed forward control, if the correction process is carried out for grindstones which have a very small amount of change in the X direction as compared with the Z direction, as shown in FIG. 11, even a very small amount of servo lag will have an effect on the grindstone correction shape. In this case, adjustment of the amount of servo lag is carried out by adjusting the feed forward gain. This adjustment of the amount of servo lag is carried out by a difficult tuning operation performed by the human operator, resulting in the expense of much time and effort and inconsistencies due to human error. Moreover, if correction of the servo system takes into consideration such factors as changes in the amount of friction with the passage of time etc., more problems and more work is involved in readjustment of the feed forward gain by the tuning operation.

SUMMARY OF THE INVENTION

Figure 1:
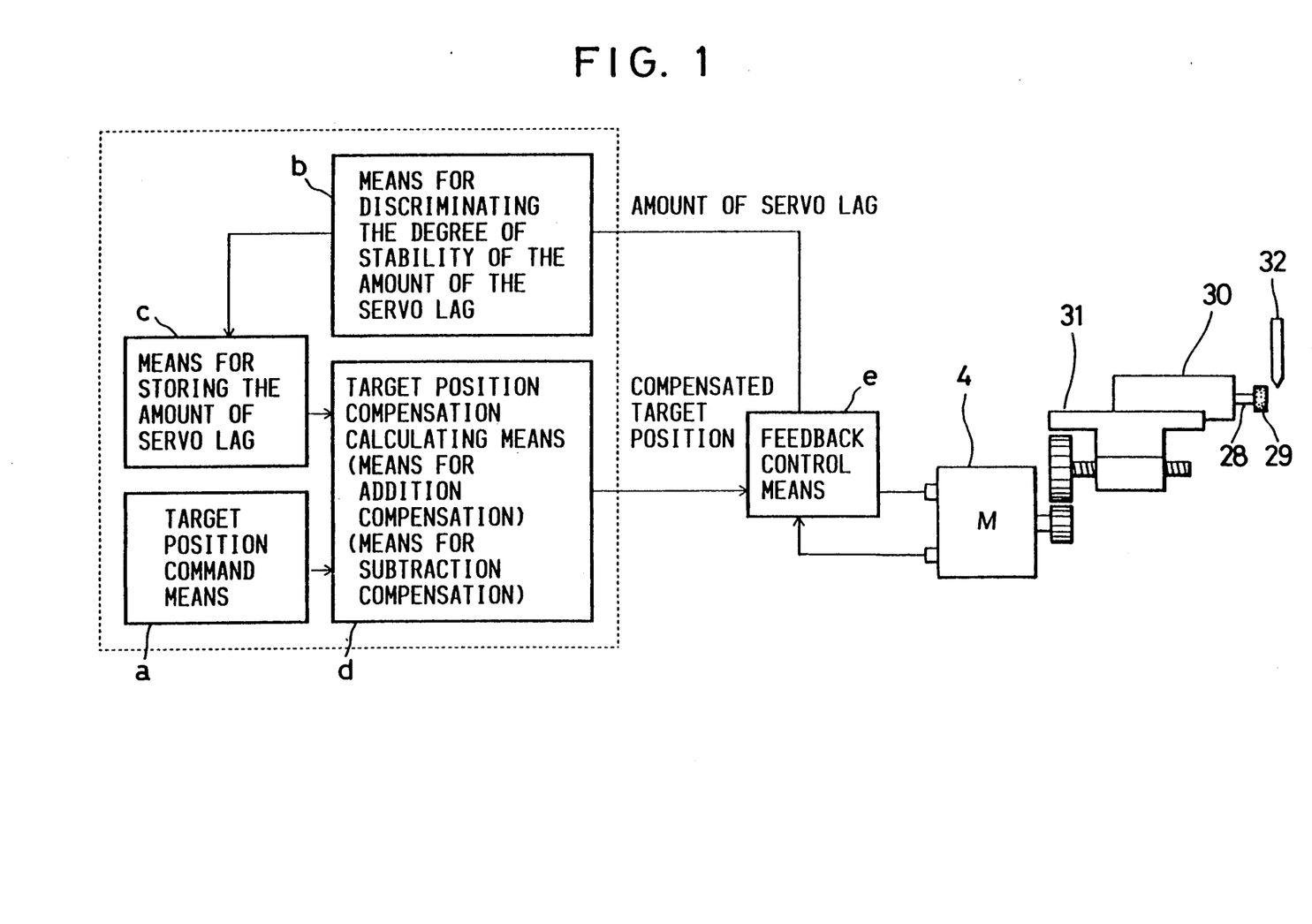
FIG. 1 is a diagram showing an embodiment of the present invention.

The present invention is intended to provide a remedy to the drawbacks described above. An object of the present invention is to provide a numerical control device for a grinding machine which automatically carries out adjustment of the amount of servo lag when carrying out the grindstone correction process. In order to achieve this objective, the present invention provides a numerical control device for a grinding machine which controls a grinding machine equipped with, as shown in FIG. 1, at least spindle 30 which has a grindstone 29 for grinding at the end of a rotor shaft 28, a grindstone table 31 wherein the spindle is fixed, a dresser 32 which carries out the correction process for the grindstone and a servo motor 4 which moves the dresser in the dresser shaft center X and rotor shaft center Z directions relative to the grindstone. The numerical control device is equipped with command means a which commands the target position of the servo-motor 4 for each unit time, discriminating means b which discriminates the degree of stability of the amount of servo lag of the servo-motor 4, and storage means c which stores anew the amount of servo lag discriminated as being stable by the discriminating means b. The numerical control device also includes compensation calculating means d which calculates the compensation for the target position on the basis of the output from the command means a and storage means c, and the feedback control means e which drives the servo-motor 4 on the basis of the output from the compensation calculating means d and the servo-motor 4 and which outputs the amount of servo lag of the servo-motor 4 to the discriminating means b. The compensation calculating means d consists of an adding means which adds the amount of servo lag stored in the storage means c at the time of the previous grindstone correction process to the target position. The compensation calculating means d also includes a subtraction means which subtracts the amount of servo lag stored in the storage means c at the time of grindstone correction from the target position.

A numerical control device for a grinding machine in accordance with the present invention operates so as to carry out the compensation by adding or subtracting the amount of servo lag to or from the target position for each unit of time which is determined on the basis of the amount of servo lag stored in the storage means and to carry out feedback control using the compensated target position.

BRIEF DESCRIPTION OF THE DRAWINGS

FIG. 5 (b) is a diagram of the compensated target position command sent to the shaft controller (CPU 23).

FIG. 5 (c) is a diagram of the actual track of the grindstone table.

DETAILED DESCRIPTION OF THE INVENTION

A detailed explanation of the invention follows using FIG. 2 to FIG. 11.

Identical symbols are used for items which are identical with the conventional example described above and no detailed description is given for these. In this embodiment the dresser 32 is fixed with the dresser shaft center established as the X axis and the rotor shaft center as the Z axis; and an explanation is made for carrying out the correction process for the grindstone by moving the grindstone table in the X and Z directions by means of the servo motor.

Figure 2:
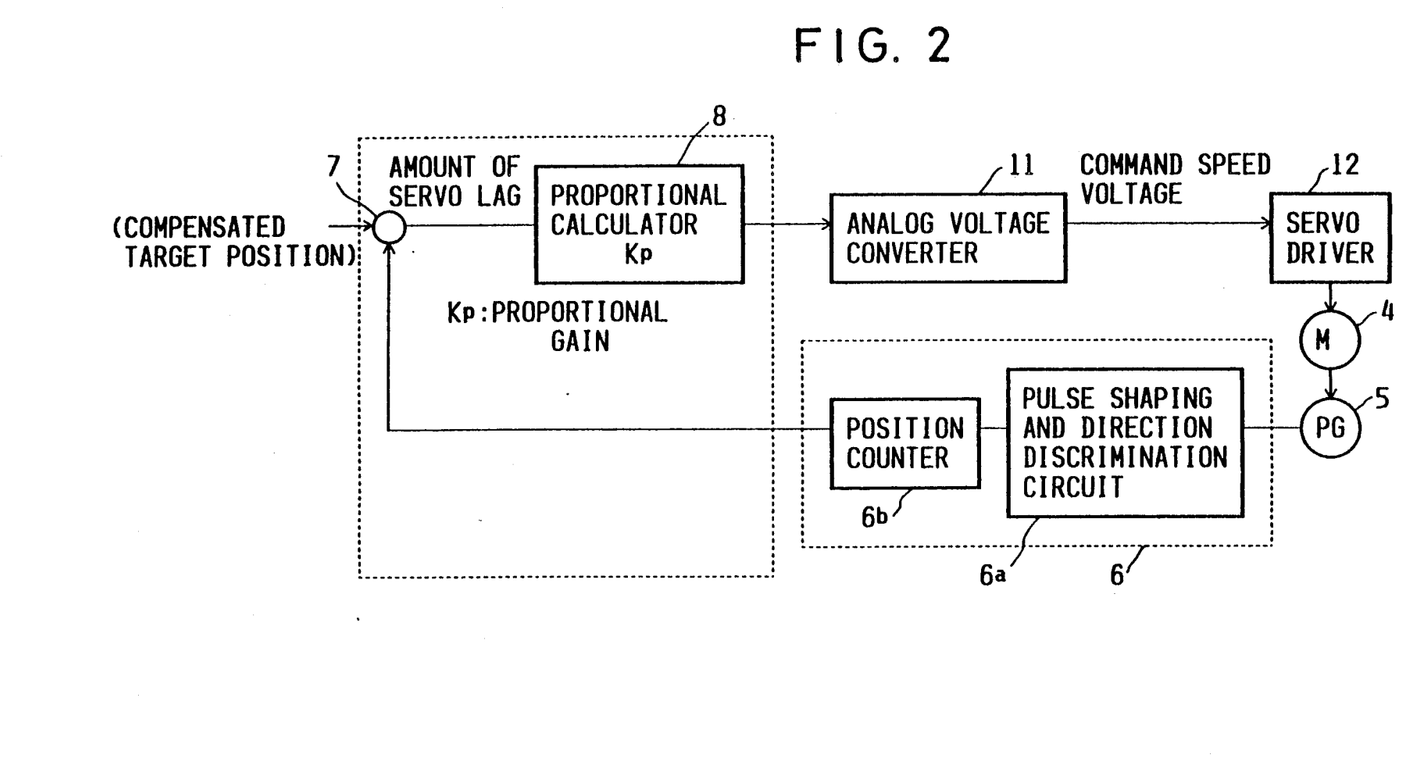
FIG. 2 is a block diagram of the servo process system of the present invention.

FIG. 2 shows the block composition of the servo process system according to the present invention. This servo process system is a control which gives the compensated target position for which the compensation operation described later has been applied to the servo-motor 4, which is linked to the grindstone table, and gives feedback of the present position of the servo-motor.

Figure 3:
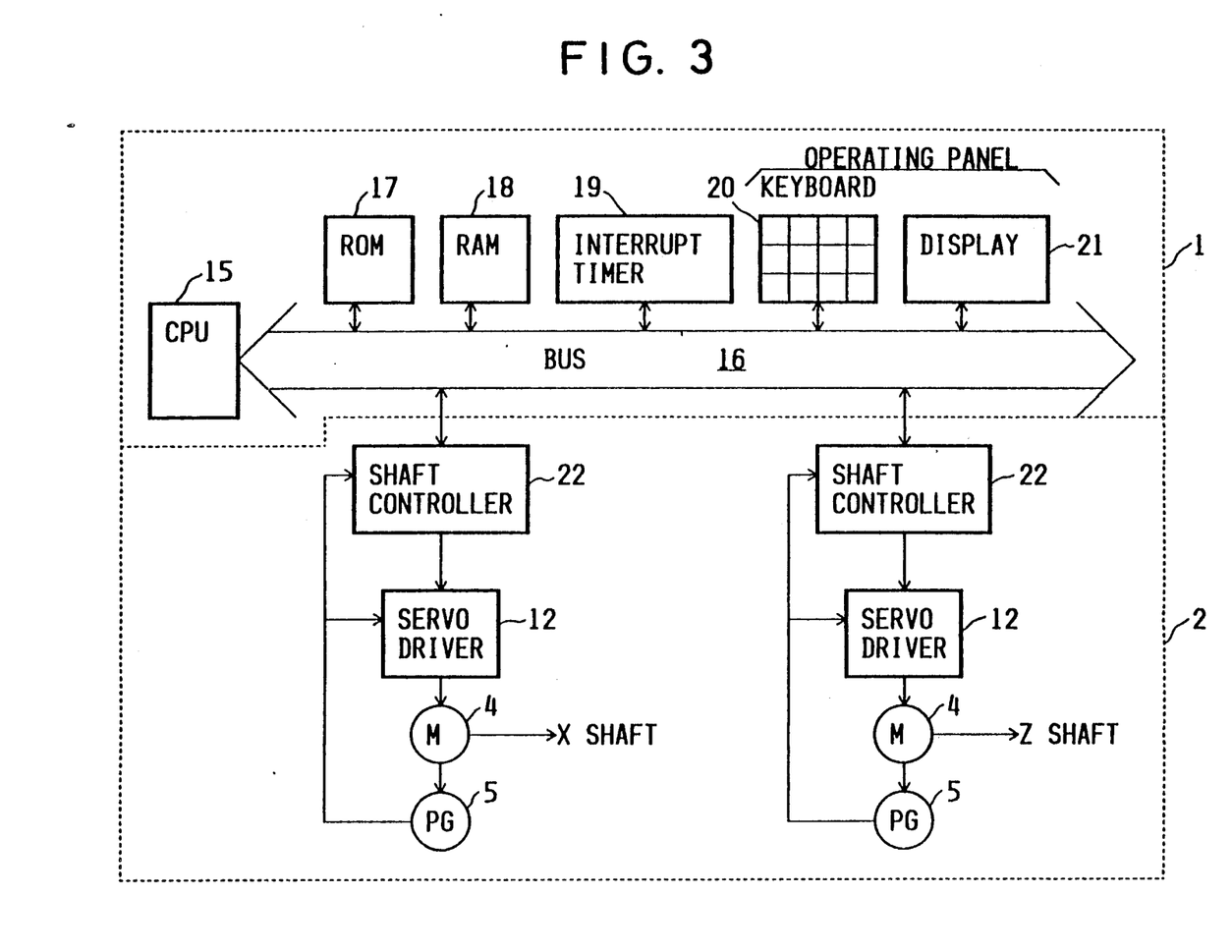
FIG. 3 is a block diagram of the hardware of the system shown in FIG. 2.

The feedback control is made up of a pulse generator 5 which is linked to a servo-motor 4, a position converter 6 which is equipped with a pulse shaping and direction discrimination circuit 6a, which converts the output of pulse generator 5 into a present position, and with a position counter 6b. A comparator 7 compares the output of the position converter (present position) and the compensated target position and determines the amount of servo lag. A proportional calculator 8 determines from the output of the comparator 7 (the amount of servo lag) a proportion of the command speed of the servo-motor 4. An analog voltage converter 11 converts the proportional, calculator output into a servo-motor command speed voltage, and a servo driver 12 drives the servo-motor 4. FIG. 3 is the hardware configuration of the system in FIG. 2. In it are shown the hardware 1 of the micro-computer which calculates the compensation for the compensated target position and the hardware 2 of the micro-computer which carries out the feedback control.

The hardware 1 is made up of CPU 15, ROM 17 which stores the system software in bus 16 of CPU 15, RAM 18 which stores the parameters and the like, interrupt timer 19 which interupts the CPU 15 at each set time, and an operating panel equipped with keyboard 20 and display 21. Further, the hardware 2 is made up of a pair of shaft controllers 22 which are connected to the bus 16, servo drivers 12 which drive the servo-motors by the output from the shaft controllers 2, servo-motors 4 for Z shaft drive or X shaft drive, and pulse generators 5 linked to the servo-motors 4. The output of pulse generators 5 is input to servo-drivers 12 and shaft controllers 22.

Figure 4:
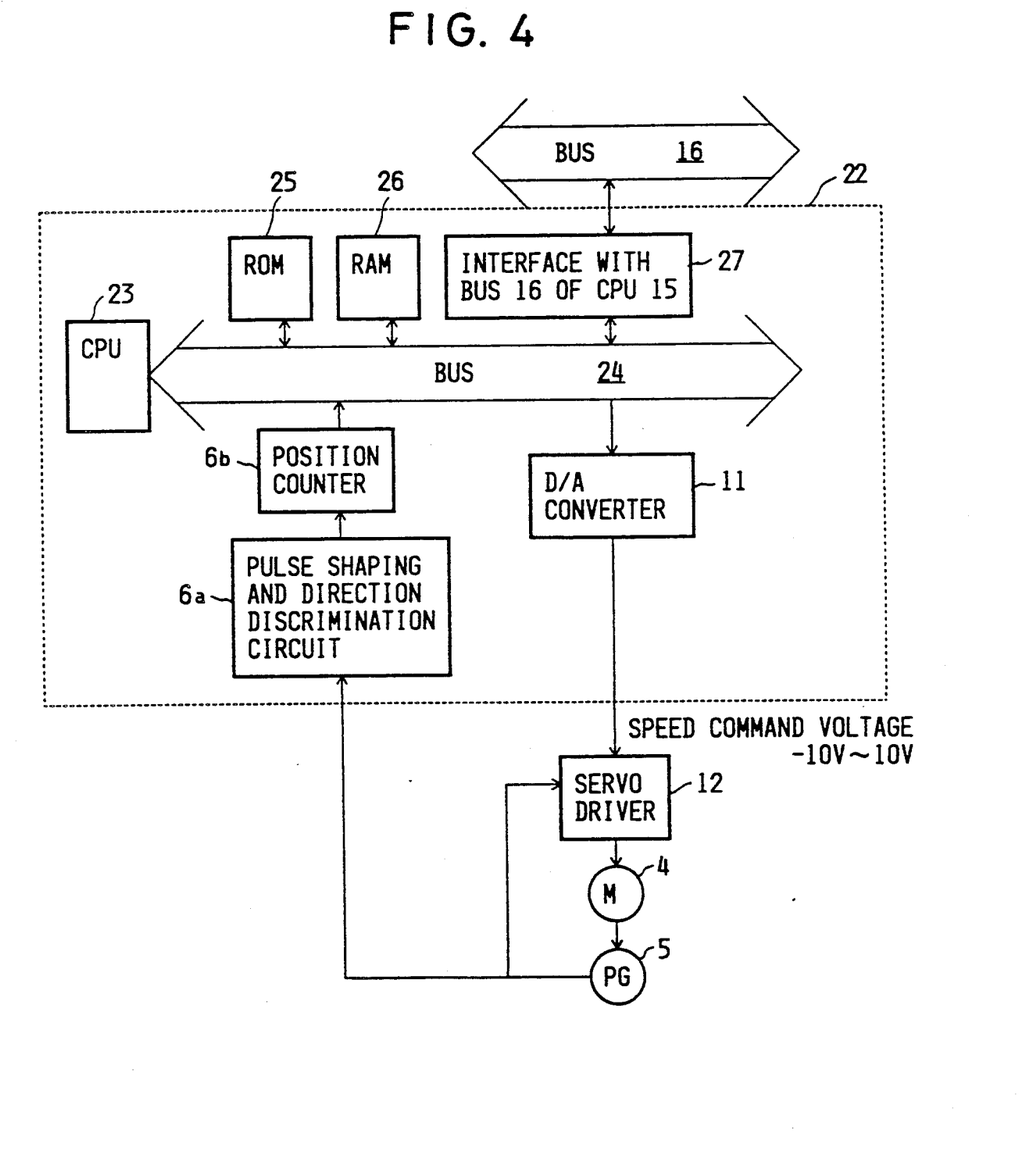
FIG. 4 is a block diagram of a shaft controller 22 shown in FIG. 3.

Additionally, the shaft controller 22 is explained in detail by FIG. 4. The shaft controllers 22 include a CPU 23, a ROM 25 which stores the system software in a bus 24 of the CPU 23, a RAM 26 which stores the parameters and the like, an interface 27 which connects the CPU 15 and the CPU 23, a pulse shaping and direction discriminating circuit 6a which shapes the pulse wave shape of the pulse generator 5 and discriminates the direction of rotation of the servo-motor 4, a position counter 6b which counts the pulses of the pulse generator 5 and makes them the present position, and a D/A converter 11 which converts digital to analog.

Figure 5A:
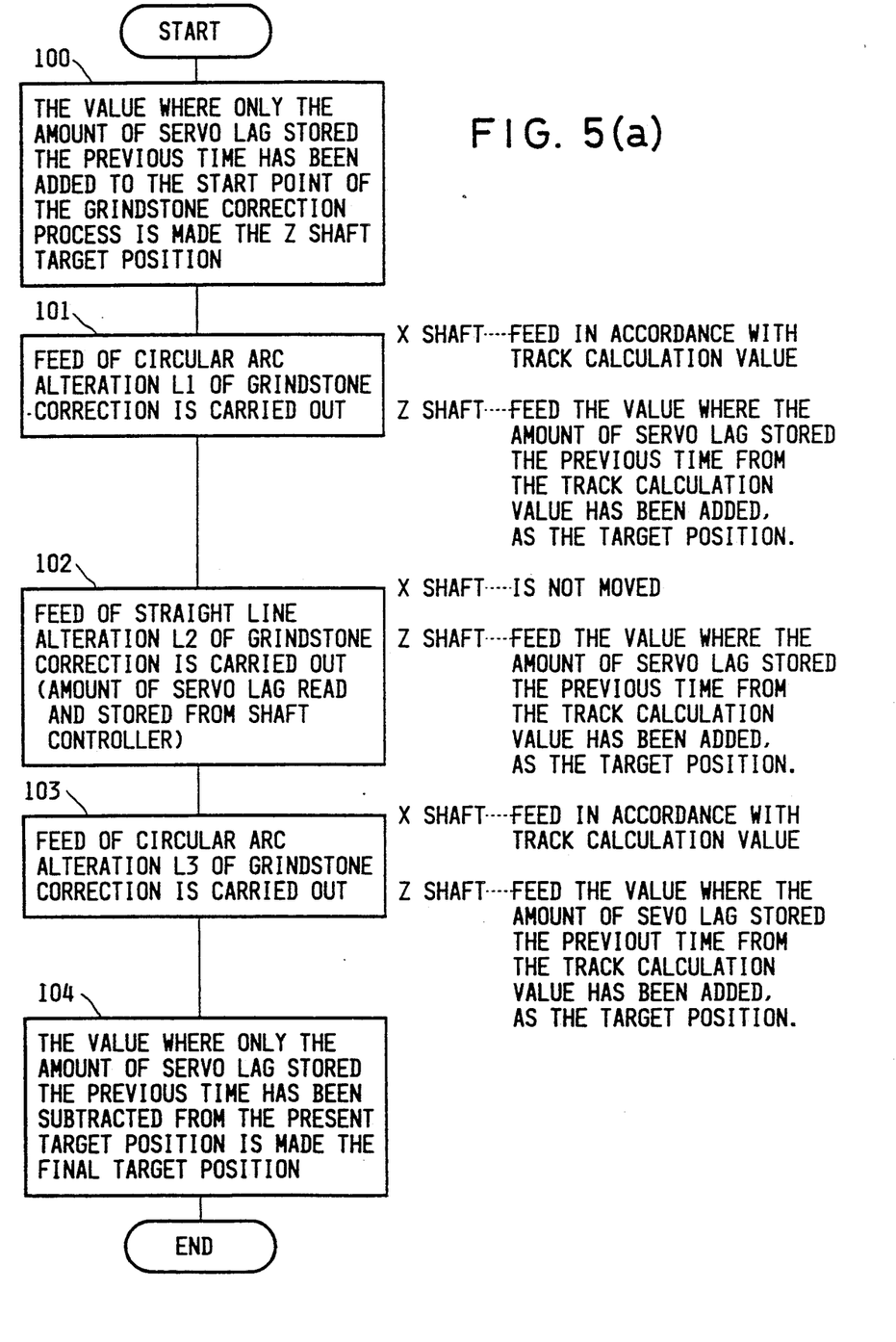
FIG. 5(a) is a flow chart of the target position compensation carried out by a CPU 15.
Figure 5B:
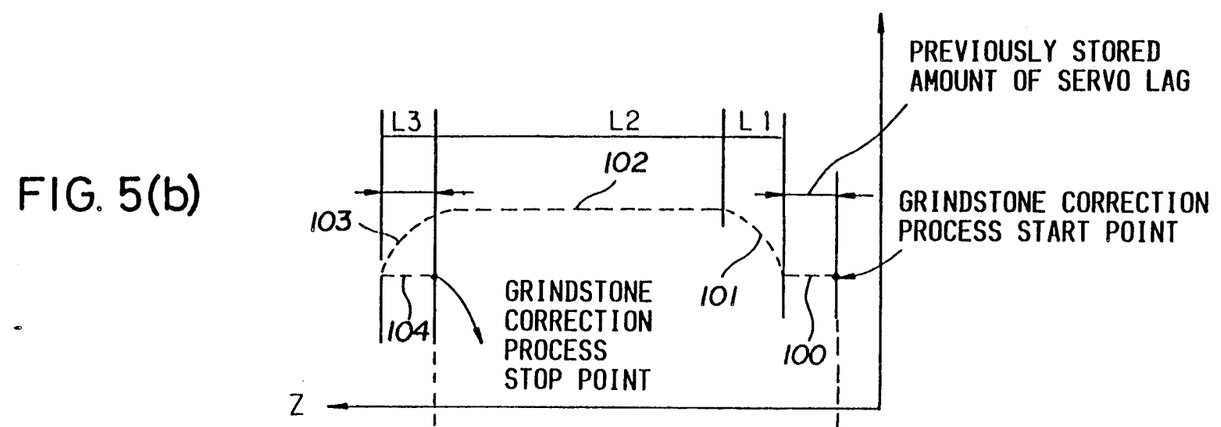
Figure 5C:
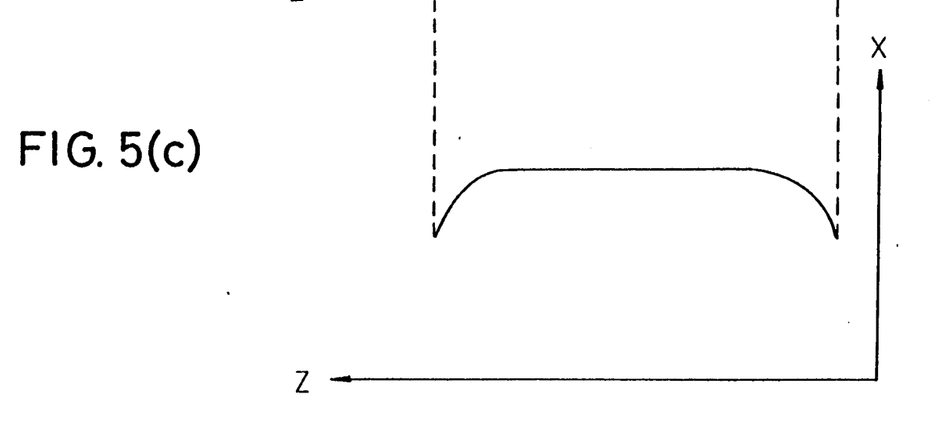
Figure 6:
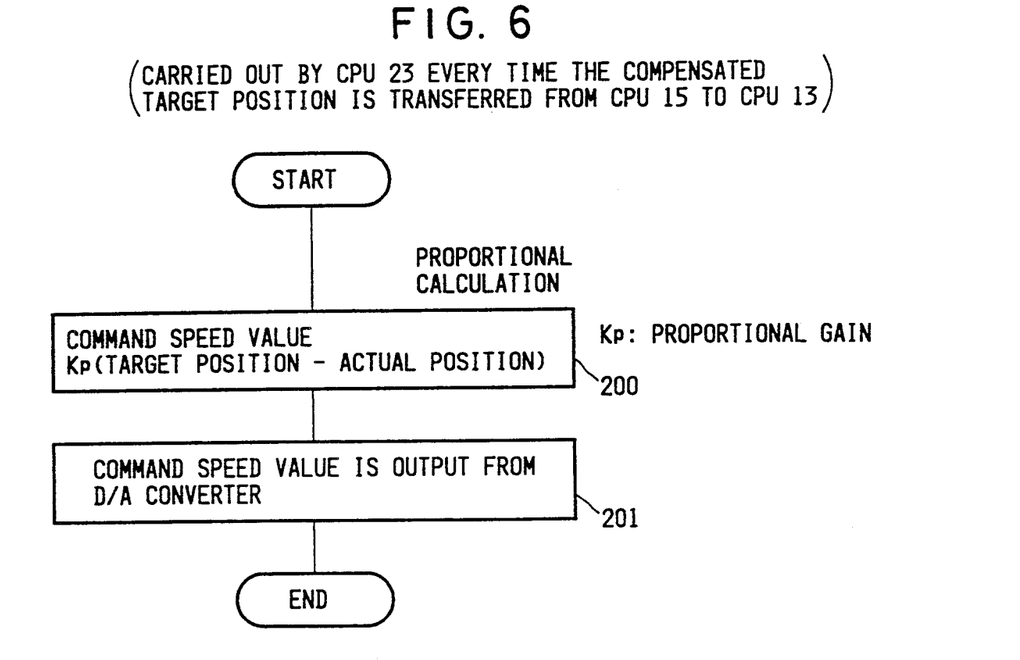
FIG. 6 is a flow chart showing the feedback control of the CPU 23.
Figure 7:
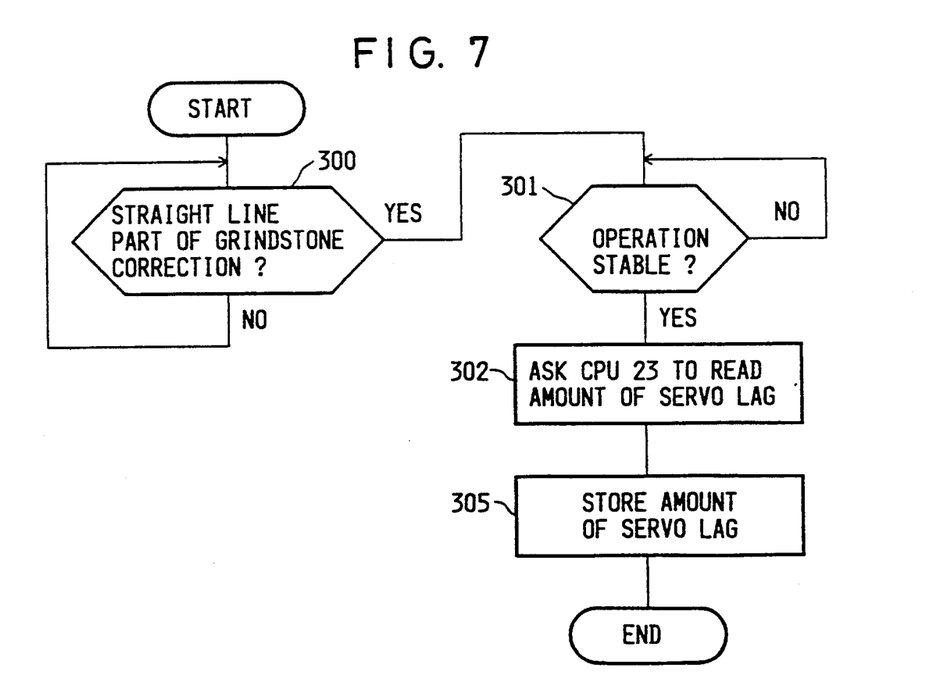
FIG. 7 is a flow chart for storing the amount of servo lag by the CPU 15.
Figure 8:
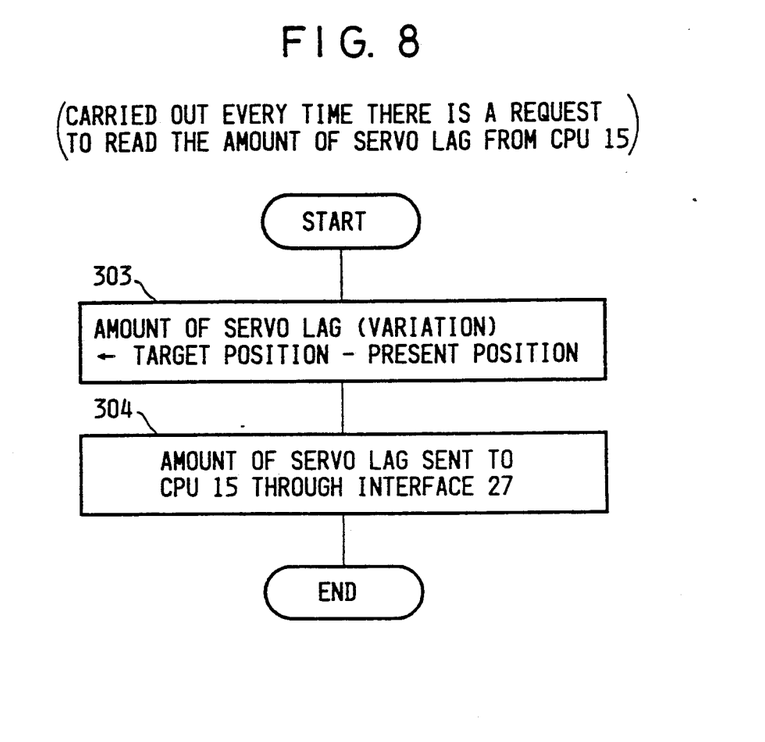
FIG. 8 is a flow chart where the amount of servo lag is calculated by the CPU 23.

Further, the flow charts shown in FIG. 5 and FIG. 7 are stored in the ROM 17, while the flow charts shown in FIG. 6 and FIG. 8 are stored in the ROM 25. This embodiment has the configuration given above and an explanation is given below of its operation according to the flow charts.

In this embodiment, the circular arc alterations L1 and L3 and straight line alteration L2 in FIG. 11 are to be carried out to effect the correction process for the grindstone 29, as shown in FIG. 11.

As the component of the velocity of the grindstone in the X axis direction is small, the amount of X axis servo lag is small and the can be ignored and target position compensation will not be made for the X axis but will be made for the Z axis only.

FIG. 5 is the flow chart used to carry out compensation of the target position. If the X and Z target positions for the circular arc alteration L1, straight line alteration L2 and circular arc alteration L3 are track calculated for each unit of time in the CPU 15 and output, the flow chart in FIG. 5 (*a*) is used.

Immediately before the start of the cyclical grindstone correction process, the target position Z of the Z axis becomes the start point for the grindstone correction process. Simultaneously with the start of the grindstone correction process, the target position Z of the Z shaft, compensated to a value where only the amount of servo lag stored the previous cycle is added to the grindstone correction process starting point, is fed from the CPU 15 to the CPU 23. At this time the X axis target position X does not change (step 100). Next, for the circular arc alterations L1 in the grindstone correction process, the X axis target position X commanded from the CPU 15 is used for the track calculation value, the Z axis compensated target position Z is used as the target position compensated from the track calculated value by a value where the amount of servo lag stored the previous time is added, and X and Z are sent to the CPU 23 (step 101). In addition, for the straight line alteration L2 in the grindstone alteration process, the X axis target position X commanded from the CPU 15 is not moved, the Z axis compensated target position Z is used as the target position compensated from the track calculated value by a value where the amount of servo lag stored the previous time is added, and X and Z are sent to the CPU 23 (step 102). For the circular arc alteration L3 in the grindstone correction process, the X axis target position X is used for the track calculated value, and the Z axis compensated target position Z is used as the target position compensated from the track calculated value by value where the amount of servo lag stored the previous time is added, and X and Z are sent to the CPU 23 (step 103).

Upon completion of the circular arc alteration L3, the Z axis target position Z becomes a value where only that part of the amount of previously stored servo lag in the Z axis positive direction has been added to the original grindstone correction process stop point. Accordingly, a value having only that part of the amount of previously stored servo lag which is finally subtracted from this target position Z is used as the Z axis final target position and it is sent from the CPU 15 to the CPU 23. The X axis target position X at this time does not change (step 104).

In steps 100 to 104 described above, when the compensated target position is sent to the CPU 23 the flow chart shown in FIG. 6 is implemented. That is to say, referring to the flow chart in FIG. 6, when the compensated target position is transferred from the CPU 15 to the CPU 23 through bus 16, the interface 27 and the bus 24, the present position, which is output through circuit 6a, pulse shapes the output of the pulse generator 5 linked to the servo-motor 4 and discriminates direction, and position counter 6b, is subtracted from the compensated target position. The amount of servo lag which is the result of this subtraction is multiplied by a proportional gain Kp, the value of the command speed is calculated (step 200), and then the command speed is output from the D/A converter (step 201). This command speed is applied to the servo-motor 4 through servo driver 12 and the servo-motor is driven and the grindstone table is moved.

However, in step 100 and step 104, as the servo system is in fact lagging by the amount of servo lag only, the grindstone table hardly moves.

Therefore the track computed value of the target position for the grindstone table before compensation and the actual track of the grindstone table coincide and the desired grindstone correction process can be carried out.

Further, FIG. 7 is a flow chart where the amount of servo lag is stored. A discrimination is made in the CPU 15 as to whether or not the grindstone correction process is the straight line alteration L2 or not (step 300). If the grindstone correction process is not the straight line alteration L2, it returns to the discrimination loop (step 300). Meanwhile, the CPU 15 is carrying out the track calculation and output process shown in FIG. 5 in parallel. If, on the other hand, the grindstone correction process is the straight line alteration L2, discrimination of operating stability of the amount of servo lag is carried out (step 301) and a demand is sent to the CPU 23 through the interface 27 to read the amount of servo lag. For operating stability discrimination, the amount of servo lag is read several times in a set interval, and when the amount of servo lag has become constant it is judged to be stable (step 302). And when a demand is received in the CPU 23, the present position is subtracted from the target position on the basis of the flow chart in FIG. 8 (step 303), and the subtracted servo lag resulting from the subtraction is transferred to the CPU 15 through to interface 27 (step 304).

The CPU 15 stores this amount of servo lag in the RAM 18 (step 305). This stored amount of servo lag is used as the reference for the amount of compensation of the target position the next time the grindstone correction process is carried out.

Consequently, every time the grindstone correction is carried out the amount of servo lag is stored anew, and it is possible to use the device without adjustment even for changes in the servo system with the passage of time because this stored amount of servo lag is used for the target position compensation when next carrying out the grindstone correction process.

Figure 9:
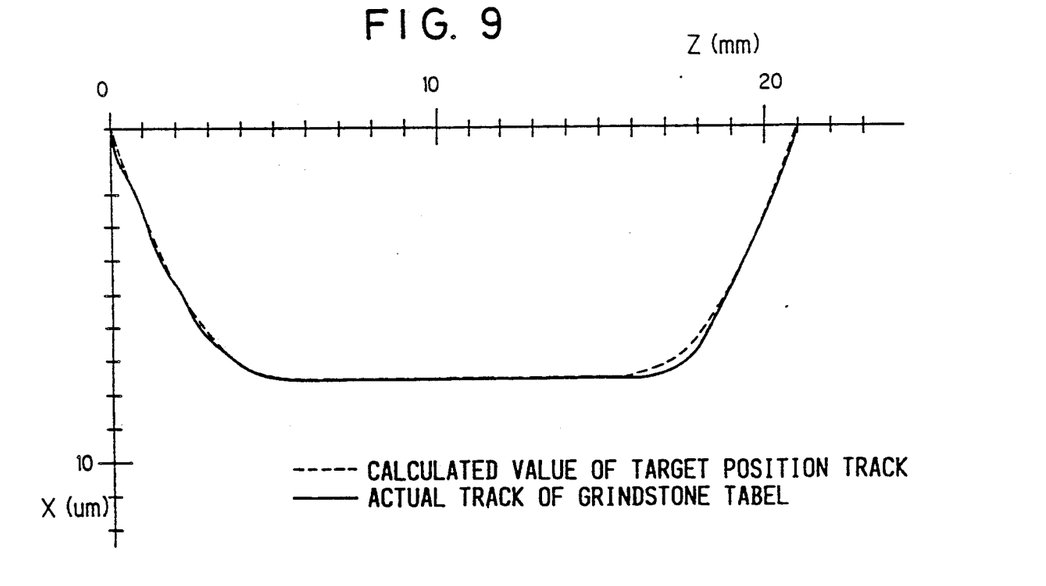
FIG. 9 is a diagram of the target position track and tracks showing the actual movement of the grindstone table resulting from tests using the present invention.

FIG. 9 is test data when a device in accordance with the present invention was actually operated. The dotted lines show the calculated value of the target position track and the solid lines show the actual track of the grindstone table. As is clear from this test data, the actual track of the grindstone table can be virtually made to coincide with the calculated value of the target position track.

In the above embodiment, the configuration was such that the dresser was fixed and the grindstone table was moved in the X and Z directions; but instead of this the dresser can move in the X and Z directions and the grindstone table can be fixed, or the dresser may move in the X direction and the grindstone table may move in the Z direction. Also, the dresser may move in the Z direction and the grindstone table may move in the X direction.

As described above, the numerical control device for a grinding machine in the present invention has advantages such as that there is little distortion in the grindstone shape after the grindstone correction process occurring due to the amount of servo lag on account of compensating the target position of the servo-motor and giving the servo position command on the basis of the amount of servo lag stored during the previous grindstone correction process, and it is possible to carry out the desired correction process in addition to which, adjustment of the amount of servo lag is stored anew each time the grindstone correction process is carried out. The tuning operation does not require a human operator, and labor and time can therefore be reduced and operability improved. In addition, in accordance with the present invention, adjustment for changes in servo lag etc. is not required, passage of time with the thereby the operability improves still further.

I claim:

1. A numerical control device for controlling a grinding machine equipped with at least a spindle, a grindstone on a rotor shaft of the spindle for grinding an object, a grindstone table on which the spindle is fixed, a dresser for carrying out a correction process for the grindstone, a servo motor for moving at least one of the grindstone and the dresser relative to a dresser shaft center direction and a rotor shaft center direction, respectively, and command means for commanding a servo motor target position, the numerical control device comprising: discriminating means for discriminating a degree of stability of an amount of servo lag of the servo motor; storage means for storing the amount of servo lag discriminated as being stable by the discriminating means; compensation calculating means for calculating a compensation for the target position dependent on the outputs from the command means and the storage means; and feedback control means for controlling and driving the servo motor dependent on the outputs of the compensation calculating means and the servo motor and for outputting the amount of servo lag of the servo motor to the discriminating means.

2. A numerical control device according to claim 1; wherein the compensation calculating means comprises adding means for adding the amount of servo lag stored in the storage means during a previous grindstone correction process to the target position, and subtraction means for subtracting the amount of servo lag stored in the storage means during the previous grindstone correction process from the target position.

3. A numerical control device for controlling in a cyclical grinding correction process a grinding machine having a spindle, a grindstone fixed to a rotor shaft of the spindle, a dresser, a servomotor for moving at least one of the grindstone and the dresser relative to a dresser shaft center direction and a rotor shaft center direction, and command means for commanding a target position, the numerical control device comprising: discriminating means for discriminating a degree of stability of an amount of servo lag of the servo motor; storing means for storing the amount of servo lag discriminated as being stable by the discriminating means; compensation calculating means for calculating a compensation value of the target position dependent on outputs from the command means and the storing means; and feedback controlling means for controlling the servomotor dependent on outputs from the compensation calculating means and the servomotor and for outputting the amount of servo lag to the discriminating means.

4. A numerical control device according to claim 3; wherein the compensation calculating means includes means for adding the amount of servo lag stored in the storing means during a next previous cycle of the grindstone correction process to the target position to calculate a compensated target position dependent thereon; and the feedback controlling means includes means for controlling the servo motor dependent on the compensated target position.

5. A numerical control device according to claim 4; wherein the compensation calculating means includes means for subtracting the amount of servo lag stored in the storing means during a next previous cycle of the grindstone correction process from the target position to calculate the servo lag of a present cycle of the grindstone correction process to calculate s subtracted servo lag; and the feedback controlling means includes means for outputting the subtracted servo lag as the amount of servo lag to the discriminating means.

* * * * *